Jan. 8, 1935.  W. O. WHITE  1,987,383
MARINER'S SPHERICAL COMPASS
Filed Jan. 6, 1931  2 Sheets—Sheet 1
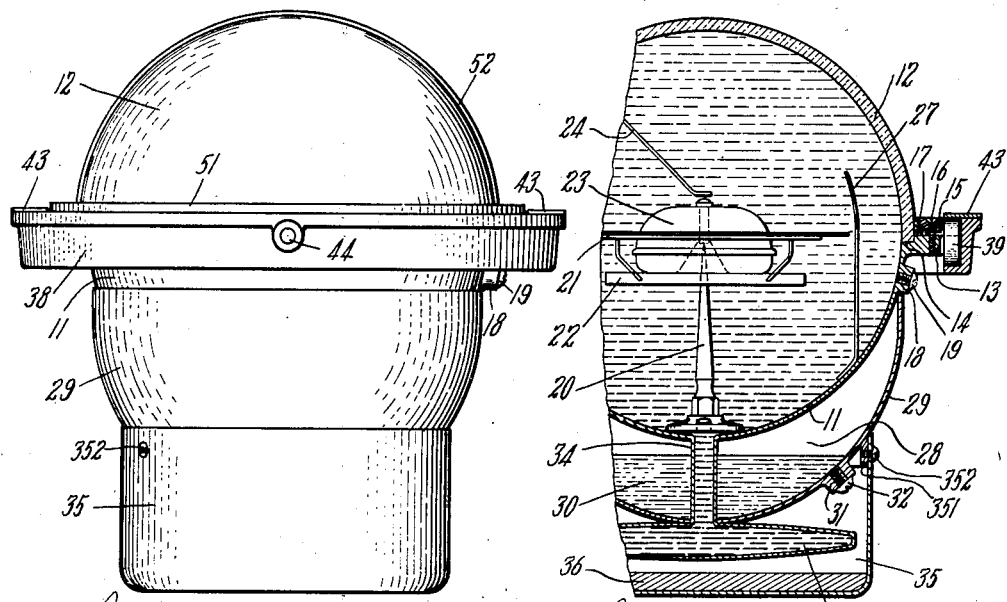
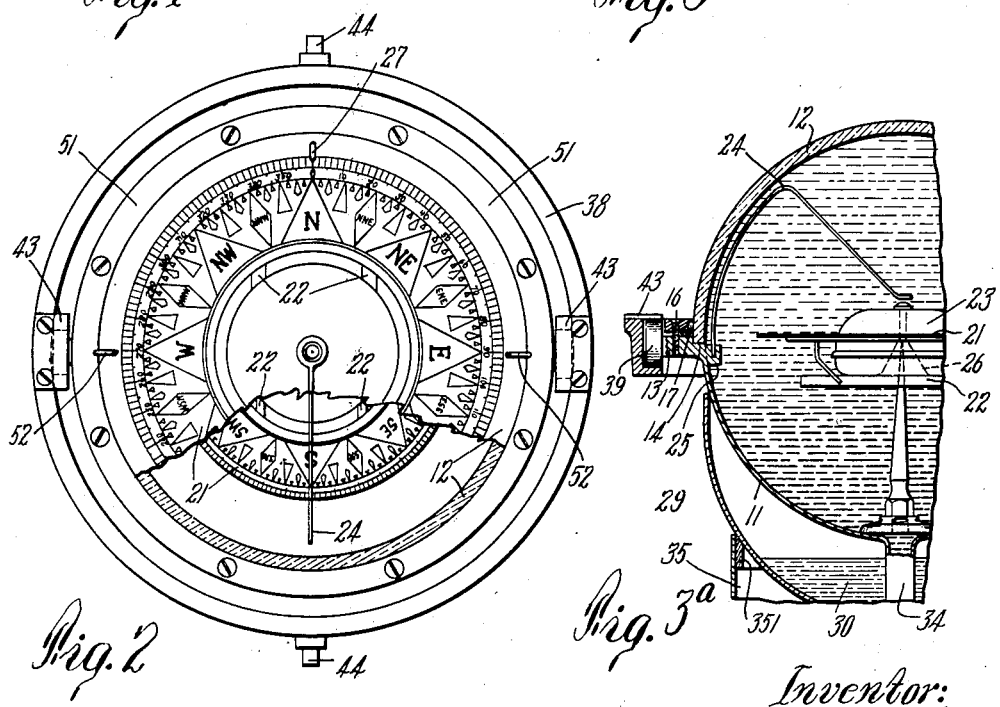
Inventor:
Wilfrid O. White.
by Wright, Brown, Quinby & May
Attys.

Jan. 8, 1935.  W. O. WHITE  1,987,383
MARINER'S SPHERICAL COMPASS
Filed Jan. 6, 1931   2 Sheets-Sheet 2
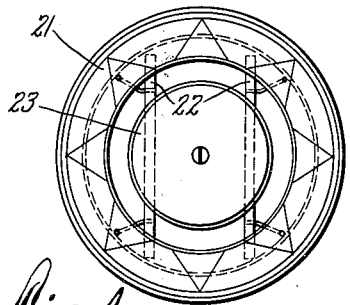
Fig. 4
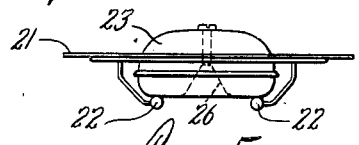
Fig. 5
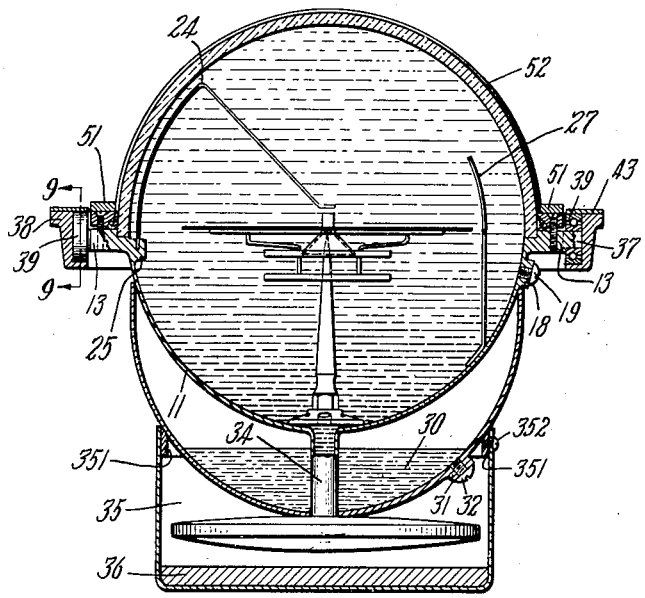
Fig. 6
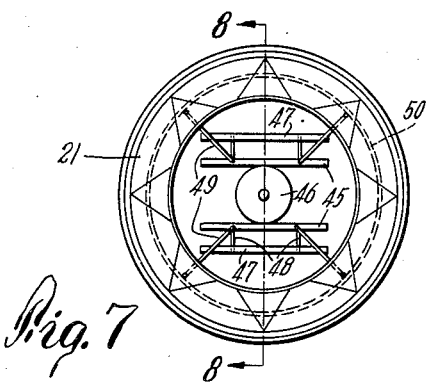
Fig. 7
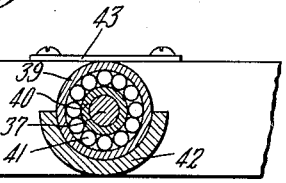
Fig. 9
Fig. 8
Inventor:
Wilfrid O. White.
by Wright, Brown, Quinby & Hay
Attys.

UNITED STATES PATENT OFFICE 1,987,383

MARINER'S SPHERICAL COMPASS

Wilfrid O. White, Newton, Mass.

Application January 6, 1931, Serial No. 506,915

10 Claims. (Cl. 33—223)

This invention relates to mariners' compasses and the like, having a spherical bowl completely filled with liquid in which the card and needle are submerged, and mounted in gimbals of which the axes coincide with the pivot of the card. It consists in a compass of this character in combination with means for damping the pendulum action of the bowl, together with a new arrangement of expansion chamber in combination therewith, a novel azimuth circle, an improved arrangement of the magnetic system causing dead beat action of the compass card, and other features as described and claimed in the following specification.

In the drawings,—

Fig. 1 is a side elevation of a compass embodying this invention, in association with a gimbal ring;

Fig. 2 is a plan view of the compass so shown;

Figs. 3 and 3a are vertical sections of parts of the compass, collectively showing the entire compass;

Figs. 4 and 5 are a plan view and side elevation respectively of one form of compass and magnetic needles, combined with a float, usable in this compass;

Fig. 6 is a vertical sectional view showing essentially the same compass but equipped with a different magnetic system, designed particularly to produce dead beat action of the compass card;

Fig. 7 is a plan view of the compass card and magnetic system shown in Fig. 6;

Fig. 8 is a cross section of the same on line 8—8 of Fig. 7;

Fig. 9 is a detail of the ball bearing for one of the gimbal pivots, taken on line 9—9 of Fig. 6.

Like reference characters designate the same parts wherever they occur in all the figures.

The compass bowl is a sphere, preferably as nearly as possible a perfect sphere, at least internally. It is made of two parts separated and fitted together on a central horizontal plane, namely, a lower hemisphere 11 of brass or other suitable metal, and an upper hemisphere 12 of transparent glass. The lower hemisphere may be made by pressing or spinning a blank of sheet metal into form by known methods of metal working, or it may be made as a casting, and the glass hemisphere may be made with sufficient accuracy of curvature and uniformity of thickness by known glass blowing or molding methods. On the rim of the metal hemisphere is an outstanding flange 13 having a rabbet or groove 14 in its upper side to receive the rim of the glass hemisphere. Both hemispheres are made with exactly or approximately the same interior diameter and are finished at their edges so as to make a close fitting joint in order to diminish as far as possible disturbance in liquid with which the bowl is filled through oscillation of the bowl. A packing ring or gland 15 is connected to the flange 13 by screws 16 and has a beveled surface adjacent to the glass hemisphere adapted to crowd an interposed ring of flexible and compressible packing material 17 against the outside of the glass to prevent leakage. A filling opening surrounded by a nipple 18 is provided in the side of the metal hemisphere and is tightly closed by a removable screw plug 19 or other closing means.

A pivot 20 is secured to the lower hemisphere, and rises to a termination in a point at the center of the sphere, where it supports the compass card and magnetic equipment. The assemblage of compass card 21, magnetic needles 22 and float 23, shown in Figs. 2-5 inclusive, is the same as the corresponding assemblages commonly used heretofore in marine compasses, and is provided with a bearing jewel, as usual, to receive the pivot point. A new feature used in this connection, however, is a retainer for the card assemblage which prevents it from falling away from the pivot when the bowl is tipped up for filling, or on any other occasion; such retainer being a rod or stiff wire 24 which is fastened at one end to a lug 25 on the inside of the lower hemisphere, and the other end of which lies close above the center of the card assemblage, out of contact with it but near enough to prevent the assemblage from leaving the pivot if the bowl is capsized. It may be noted that the float is formed with a conical recess 26, as usual, at the apex of which the pivot bearing is located, and the sides of which guide the pivot to the bearing in assembling, and cooperate with the retainer to prevent complete separation; while the angle of the recess is wide enough to permit considerable tilting of the card and float with respect to the pivot, or vice versa. Between its ends the retainer is bent or offset, substantially as shown in the drawings, so as to avoid interference with the card within the maximum degree of tilting permitted otherwise.

In place of the usual lubber-line, which in most compasses is a mark on the inside of the bowl, I provide in this compass an index 27 in the form of a slender rod or stiff wire or the like secured at its lower end to the inside of the bowl and rising above the plane of the compass card, near to but clear of the rim thereof. This index may be curved on an arc concentric with the sphere in a vertical plane. I call this index the lubber-line of my compass, for convenience of description and by reason of its analogy to the lubber-line of the usual compass.

A ballasting chamber 28 is associated with this compass, being provided by an outer bowl 29 of substantially hemispherical shape, the rim of which overlaps the lower hemisphere 11 of the bowl from beneath and is secured thereto by soldering, brazing, or other suitable means. This chamber contains a quantity of liquid, less than enough to fill it, preferably of a viscous character, to act as a drag or damper, retarding and checking its swinging motion under the action of gravity about its supporting pivots. A suitable, and the preferred, liquid for this purpose is glycerine, although other liquids may be used which have suitable viscosity and relative immunity from variation in condition by temperature changes.

The bowl 29 which provides this chamber is preferably spherical in that part which contains the damping liquid in order that its action may be the same in all directions, but in its upper part may have any form which best serves for connection with the compass bowl proper. Its connection to the latter, however, is such as to seal its entire circumference whereby to prevent leakage of the damping liquid when overturned. There is no connection permitting liquid flow between the chamber and the interior of the bowl. A filling opening 31 is provided in its side and closed by a plug 32.

An expansion chamber 33 is located below the ballasting chamber and is connected with the interior of the compass bowl by a conduit 34 which passes through the ballasting chamber. This conduit is also a baffle to free movement of the damping liquid, as later explained. Preferably the expansion chamber and the connecting tube are coaxial with the line of centers of the bowl and ballasting chamber. This expansion chamber is provided for the same purpose for which compasses are customarily provided with expansion chambers, i. e., to avoid injury to the bowl by expansion or contraction with temperature differences of the liquid which fills the bowl. It is made as a shallow cylindrical box or drum having flexible end walls in the nature of diaphragms adapted to bulge under expansive pressure and collapse under excess atmospheric pressure when the liquid contracts, without injury. The base of the pivot post 20, which is mounted over the upper orifice of the conduit 34, is notched, perforated, or otherwise formed with sufficient openings to permit free flow of the liquid between the bowl and expansion chamber.

A hollow base 35 having a flat bottom is provided as a shield to protect the expansion chamber from injury, and also as a means by which the compass may be set upright on a supporting surface of any sort when not hung in a binnacle. Although this base may be weighted, as indicated for illustration by the weight 36 in its bottom shown by these drawings, such weight is not essential. The structure of the compound bowl and ballasting chamber, with the expansion chamber, is such as to bring the center of gravity of the assemblage below the pivotal center, which is enough to hold the bowl upright when the binnacle is tilted, and the damping effect is more pronounced when the suspended weight is not excessively heavy.

The lower hemisphere of the compass bowl is provided with trunnion pivots 37 projecting from the flange 13 at opposite ends of a diameter of the sphere, as shown in detail in Fig. 6. These trunnions are coupled to the gimbal ring 38 by ball bearings, the preferred construction of which is shown in detail in Fig. 9. The bearing is a self-contained unit consisting of an outer ring 39, an inner ring 40 and intermediate balls 41. The trunnion is entered in the inner ring with a tight fit, and the outer ring of the bearing is placed in a semi-circular socket 42 in the inside of the gimbal ring and secured therein by an overlapping retainer plate 43 detachably screwed to the upper side of the gimbal ring. The trunnions 44 of the gimbal ring are located on a diametral axis at right angles to that of the trunnions 37 and are mounted in the holding ring of a binnacle, or equivalent holder, preferably by ball bearings like that just described.

An alternative form of card and magnetic assemblage to that previously described, and designed to produce a dead beat action of the compass card, is shown in Figs. 6, 7 and 8. In this case the float is omitted and smaller and lighter needles substituted for the larger needles shown in the other form, whereby the mass, weight and momentum of the assemblage is diminished. I have shown here four parallel needles arranged in two pairs at different levels for balancing effect. It is possible, however, to use only one pair of needles, and I have done so with good effect. The needles of the upper pair are designated 45, 45, and are secured to opposite points on the rim of a hollow cone 46 at equal distances from the axis thereof, while the lower pair are designated at 47, 47. The latter are spaced more widely apart, and are also at equal distances from the axis of the cone, conforming in position to a downward extension of the cone. When only two needles are used, the lower pair 47, 47 may be omitted. The advantage of dead beat action obtained with this assemblage is due to its relatively small momentum and relatively large surface area, in proportion to volume, of the smaller needles. Needles of such proportions are chosen as will give sufficient magnetic moment on the one hand, and on the other hand are of sufficiently small weight and mass to come quickly to rest upon intermission of force tending to move the card. Each needle 47 is connected to the nearer needle 45 by tie wires 48 soldered to them, while the needles 45 are connected by radial, equiangularly spaced tie wires 49 to a ring 50 on which the compass card is mounted. The cone 46 receives the extremity of the supporting pivot and has a jewel bearing therefor at its apex in the plane of the card. The retainer 24 used with this card is, or may be, the same as the one previously described, with its inner end lying close above the upper end of the screw holder in the lower end of which the bearing jewel is mounted, and which is set into a cylindrical extension from the upper end of the cone.

An azimuth circle or ring 51 is shown in Figs. 1 and 6 as mounted on the compass bowl to rest on the equatorial flange thereof and surround the upper hemisphere. It is fitted closely enough to the latter to be centered thereby, and is removable, its capacity for removal being indicated by the fact that it is omitted from Figs. 2, 3 and 3a. It carries a wire or equivalent indicator 52 formed to lie close to the glass hemisphere in a meridional plane of the compass bowl. This indicator may extend all the way around the upper side of the bowl between diametrically opposite points of the ring, or may terminate at the pole of the sphere or at any other point desired. As the azimuth circle is freely rotatable on the supporting flange, it may be turned to place the indicator in any meridional plane, and when turned so that the shadow of the indicator cast by the sun crosses the center of the card, it serves as a very convenient and at the same time accurate means for taking the bearing of the sun. It may also be used by sighting across the compass to take bearings of land marks and other objects ashore or afloat.

In referring above to the equatorial flange of the compass bowl, I have considered the structure comprised by the flange 13 and the packing ring or gland 16 as collectively forming a flange for the purposes of a convenient descriptive term for that part of the compass which supports the azimuth circle.

When the compass is in use the entire bowl and its associated expansion chamber are filled with liquid, such as the nonfreezing mixture of alcohol and water commonly used in compasses for steadying and damping the movements of the magnetic system and partly balancing its weight. The inertia of this liquid tends to hold it steady when the bowl is tilted. With the spherical form of bowl, the only force acting against the resistance of inertia upon tilting of the compass is friction, and this is insufficient to cause any appreciable movement of the liquid even when the pitching and rolling movements of the vessel are so violent and regular as to cause rhythmic swinging of the bowl about a horizontal axis of such a nature as, in a compass of the designs previously used, would cause angular displacement of the card. In spite of the utmost benefit of the means used to minimize such movements (gimbal pivots, damping fluid, heavy ballast in the base, etc.) some swinging movement will take place if the ship is much affected by a heavy sea. Such movements of the bowl are minimized in my compass by the damping liquid, by the baffle effect of the connecting tube 34 in this liquid, and by the elimination of friction at the gimbal pivots due to the ball bearings, these factors all cooperating to the same end; but even the greatest rhythmic oscillation, occurring where these refinements in the aids to steadiness are not present, is insufficient to cause deviation of the compass card in a spherical bowl of my invention.

The lenticular effect of the hemispherical body of liquid above the card causes a considerable magnification thereof, the nature of which is shown in Fig. 2 by the comparison of that part of the card which is exposed by breaking away of the glass hemisphere and the part which is indicated as being viewed through the glass. Such magnification is greatest at the side of the card next to the lubber-line, for the steersman stands at the opposite side.

The cumulative effect of all the useful features of my compass herein described is steadiness of the card and a dead beat action of all the movable parts of the compass under the most severely disturbing conditions.

What I claim and desire to secure by Letters Patent is:

1. A compass comprising a spherical bowl, gimbals for supporting said bowl, a weighted base suspended from the bowl for maintaining the same side thereof uppermost, the bowl comprising a lower hemisphere of metal, an upper hemisphere of glass having the same internal diameter as the lower hemisphere, and packing means for securing the hemispheres together and sealing the joint between them against leakage, a pivot extending from a point of support on the bowl to an extremity at the center of the bowl, a magnetic needle and compass card supported on said extremity, and a retainer extending from the wall of the bowl to a point over the pivotal center of the needle and located between its ends so as to clear the needle and compass card carried thereby, in all normal positions thereof.

2. A compass comprising a bowl forming a complete hollow sphere, a ballast chamber connected to the lower part of said bowl having a spherical form and containing a damping liquid, gimbals supporting said bowl on axes at right angles to each other in the equatorial plane of the bowl, a pivot connected to the wall of the bowl and rising to the center thereof from below the center, a magnetic needle and card supported on said pivot with freedom for movement angularly in all directions, and a retainer for the needle and card comprising a wire secured to the bowl and extending thence from a point outside of the circumference of the card on a downward angle sufficiently wide to avoid interference with the card and needle in any practical inclination thereof, to a termination above the pivot bearing of the needle and near enough thereto to prevent separation of the bearing from the needle when the bowl is capsized.

3. A compass comprising a spherical bowl having a lower hemisphere of metal and an upper hemisphere of glass, clamping and packing means for securing said hemispheres together and preventing leakage through the joint between them, a ballast chamber comprising a bowl beneath the said metal hemisphere and secured at its rim thereto, containing a quantity of damping liquid, an expansion chamber beneath said ballasting chamber, and a tube connecting the lower hemisphere and expansion chamber together running through the liquid in the ballasting chamber, and gimbal means for supporting said bowl.

4. A compass as set forth in claim 3 in which the connecting tube between the bowl and expansion chamber is located in the line of centers of the bowl and ballasting chamber.

5. A compass comprising a spherical bowl consisting of a metal lower hemisphere, a glass upper hemisphere, clamping and packing means for securing said hemispheres together and sealing the joint between them, a filling opening in the metal hemisphere having detachable closing means, a pivot rising from the lower part of the bowl to the center thereof, a magnetic needle and card assemblage supported on said pivot, and a retainer for said assemblage consisting of a rod or the like rising from the rim of the lower hemisphere to a point above the plane of the card, and thence to a termination above the pivot point and near enough to the card assemblage to prevent disengagement thereof from the pivot when the bowl is overturned, that portion of the retainer between its point of connection to the bowl and the said elevated point being throughout its length farther away from the pivot point than the rim of the card.

6. A compass comprising a completely spherical bowl having a transparent upper hemisphere and an equatorial flange, a compass card pivotally mounted in the center of said bowl, and an azimuth circle supported on said flange and fitted rotatably to the adjacent part of the upper hemisphere, provided with an index curved concentrically with the sphere and rising from the circle perpendicularly thereto.

7. The combination with a compass having a horizontal pivotally-mounted magnetically-influenced direction card of an azimuth circle concentric with the pivot of said card, supported and rotatable in a horizontal plane, and an index rising from said circle perpendicular thereto with a circular curvature centered at the pivot point of the card.

8. A compass comprising a spherical bowl having a transparent upper hemisphere and being filled with liquid, a compass card and associated dead beat magnetic equipment pivotally supported at the center of the bowl with its center of gravity below said pivotal center, a ballasting chamber suspended below the bowl and containing a quantity of damping liquid, an expansion chamber below said ballasting chamber and connected with the bowl by a tube passing through the ballasting chamber and the liquid therein, a weighted base below the expansion chamber rigidly suspended from the bowl, and ball bearing gimbal supports for the bowl.

9. A compass comprising a bowl, gimbals by which said bowl is suspended, a ballast chamber secured to the bowl beneath the bottom thereof and containing a quantity of damping liquid, an expansion chamber beneath said ballast chamber, and a tube running through the ballast chamber into connection at its opposite ends with the compass bowl and the expansion chamber.

10. A compass including a spherical bowl, gimbal supporting means from which said bowl is suspended, a ballast chamber in the form of a spherical bowl beneath the compass bowl and secured at its rim thereto with its center of curvature in vertical alinement with that of the compass bowl, a tube passing from the bottom of the compass bowl to and through the bottom of the ballast chamber bowl, and an expansion chamber in connection with the lower end of said tube.

WILFRID O. WHITE.